United States Patent

Joseph

(10) Patent No.: US 6,343,781 B1
(45) Date of Patent: Feb. 5, 2002

(54) GAS SPRING FOR A STEERABLE VEHICLE WHEEL

(75) Inventor: Adrian Joseph, Wolnzach-Geroldshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/570,386

(22) Filed: May 12, 2000

(30) Foreign Application Priority Data

May 18, 1999 (DE) .......................... 199 22 798

(51) Int. Cl.$^7$ .............................. B60G 13/10; F16F 9/02
(52) U.S. Cl. .................. 267/64.11; 267/64.21; 267/64.28
(58) Field of Search .......................... 267/64.11, 64.21, 267/64.24, 64.27, 64.28, 122

(56) References Cited

U.S. PATENT DOCUMENTS

| | | | | |
|---|---|---|---|---|
| 3,081,075 A | * | 3/1963 | Selman .......................... | 267/65 |
| 3,385,590 A | * | 5/1968 | Avner ........................... | 267/65 |
| 3,819,166 A | * | 6/1974 | Ellis et al. ................. | 267/64 R |
| 4,310,172 A | * | 1/1982 | Claude et al. ............... | 280/703 |
| 4,316,098 A | * | 2/1982 | Freitag et al. .............. | 307/119 |
| 4,325,541 A | * | 4/1982 | Korosladanyi et al. ..... | 267/8 R |
| 4,368,878 A | * | 1/1983 | Meller et al. ............ | 267/64.17 |
| 4,398,704 A | * | 8/1983 | Buchanan, Jr. et al. .. | 267/64.21 |
| 4,555,096 A | * | 11/1985 | Pryor ........................... | 267/8 R |
| 4,635,745 A | * | 1/1987 | Myers et al. ................ | 280/708 |
| 4,666,016 A | * | 5/1987 | Abe et al. ................... | 180/291 |
| 4,677,263 A | * | 6/1987 | Hamilton et al. ......... | 200/61.44 |
| 4,798,369 A | * | 1/1989 | Geno et al. ............... | 267/64.11 |
| 4,802,657 A | * | 2/1989 | Wijnhoven et al. ...... | 267/64.24 |
| 4,946,144 A | * | 8/1990 | Geno et al. ............... | 267/64.27 |
| 5,435,529 A | * | 7/1995 | Day et al. ................. | 267/64.12 |
| 5,649,692 A | * | 7/1997 | Gilsford et al. .......... | 267/64.21 |
| 5,725,066 A | * | 3/1998 | Beard et al. ............. | 180/89.12 |
| 5,749,566 A | * | 5/1998 | Vitale et al. ............. | 267/64.23 |
| 6,168,143 B1 | * | 1/2001 | Lambrecht et al. ...... | 267/64.24 |

FOREIGN PATENT DOCUMENTS

| | | | |
|---|---|---|---|
| DE | 3504217 A1 | | 8/1985 |
| DE | 3446411 A1 | * | 3/1986 |
| EP | 0 253 261 | | 6/1987 |
| JP | 57205208 A | * | 12/1982 |
| JP | 6255207 A | * | 3/1987 |
| JP | 63-251312 | | 10/1988 |
| JP | 231907 A | * | 2/1990 |
| JP | 237011 A | * | 2/1990 |
| JP | 263908 A | * | 3/1990 |
| WO | WO96/11120 | | 4/1996 |

* cited by examiner

Primary Examiner—Robert J. Oberleitner
Assistant Examiner—Melody M. Burch
(74) Attorney, Agent, or Firm—Crowell & Moring LLP

(57) ABSTRACT

A gas spring for a steerable vehicle wheel includes bellows that are supported at one end on a roll-off surface on a wheel carrier, a suspension element, or a part connected therewith, and are fastened at another end on a spring can. The spring can has an inlet opening to which a pressure hose or a pipe is connected. The pressure hose or pipe is arranged in a loop at least in an area above the bottom of the spring can and, during rotating movements of the spring can, is elastically deformed at least in that area.

13 Claims, 2 Drawing Sheets

GAS SPRING FOR A STEERABLE VEHICLE WHEEL

BACKGROUND AND SUMMARY OF INVENTION

This application claims the priority of German patent document 19922798.5 filed May 18, 1999, the disclosure of which is expressly incorporated by reference herein.

The Present invention relates to a gas spring for a steerable vehicle wheel.

European Patent Document EP-A-0 253 261 discloses a pneumatic spring which is provided on a forward McPherson strut; is penetrated by the piston rod of the shock absorber; and is bounded at the top by a fixed spring can. Laterally on the spring can, a valve is arranged through which, for regulating the pressure in the interior of the gas spring, compressed air can flow into the interior or flow out of the interior. A pressure hose or a pipe may connect to the valve. The vehicle wheel equipped with the gas spring, In addition to carrying out approximately vertical suspension movements, can also carry out steering movements approximately about the axis of the gas spring, so that the pressure hose and the pipe in the wheel house may be laid in a loop shape in order to permit these wheel movements. The floating capacity of the vehicle wheel and of the suspension elements as well as other components arranged in the wheel house is therefore limited. It cannot be excluded that, during these suspension and steering movements, the pressure hose or the Pipe in the wheel house comes in contact with other Components (e.g., a brake hose, a drive shaft or a stabilizer) or with rocks, branches, or similar objects thrown up from the road, and is damaged or causes disturbing noises. The pressure hose or the pipe can swirl the air stream in the wheel house such that, particularly at higher driving speeds, air noises occur and/or the aerodynamics of the vehicle deteriorate.

It is an object of the present invention to provide a gas spring that does not limit or hardly limits the space in the wheel house and is better protected from damage.

This object is achieved by the gas spring of the present invention. According to the present invention, the pressure hose or the pipe, which is essentially arranged above the spring can, does not limit the free space in the wheel house and cannot strike against objects in the wheel house and therefore be damaged or cause noise. During steering movements, the pressure hose or the pipe can at least slightly deform elastically, whereby the steering movements of the vehicle wheel are not or are hardly limited. In a preferred embodiment, the pressure hose or the pipe forms a loop above the spring can which extends, for example, along a closed circle or slightly beyond it. The loop requires little space above the spring can, which may be formed by an annular space between two parts or in one part which is connected with the spring can or the vehicle body. The pressure hose or the pipe can be covered at least in areas, for example, by a cylindrical wall area on a part fixed to the vehicle body or connected with the spring can, whereby the pressure hose or the pipe is arranged in a covered and protected manner.

Other objects, advantages, and novel features of the present invention will become apparent from the following detailed description of the invention when considered in conjunction with the accompanying drawings.

DETAILED DESCRIPTION OF THE DRAWINGS

Figure 1:
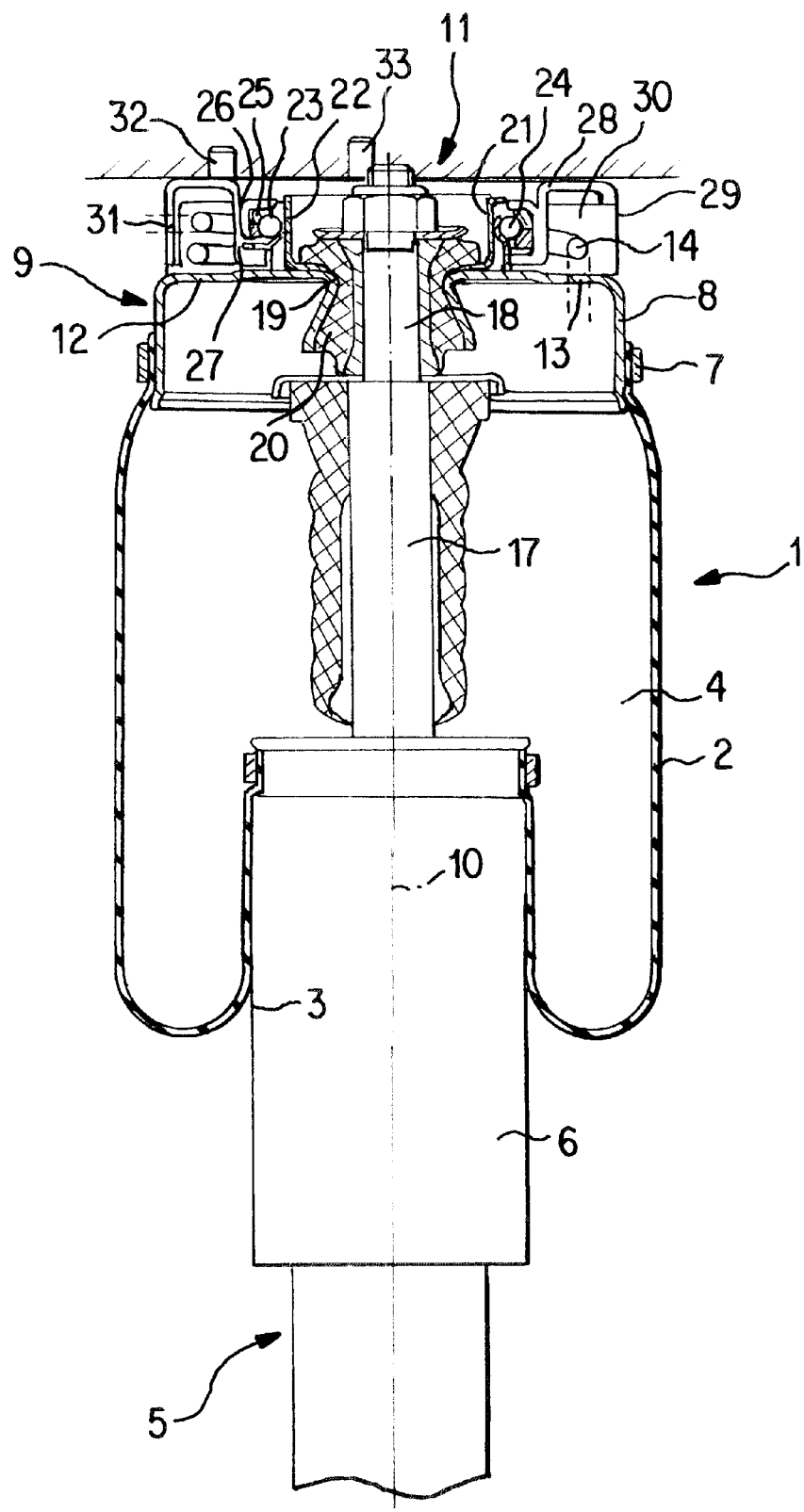
FIG. 1 is a longitudinal sectional view of the gas spring.

The gas spring 1 illustrated in FIG. 1 is provided for the resilient support of a steered front wheel on a motor vehicle and has U-type bellows 2 which can be loaded with pressure on the inside by way of a gaseous medium 4, such as air. The U-type bellows 2 are supported at their end, which is rolled in at the bottom, on a roll-off surface 3 which is formed by an outer tube of a shock absorber 5 or a part 6 connected therewith or supported thereon. The upper end of the gas spring 1 is supported by way of a clamping ring 7 or the like on the cylindrical wall 8 of a spring can 9 which, approximately rotatably about the axis 10 of the gas spring 1, is fastened on the vehicle body 11.

An axial inlet opening 13 is formed in the bottom 12 of the spring can 9, to which inlet opening 13 an end of a pipe 14 is connected directly or by way of a connection element. The pipe 14 is essentially arranged above the bottom 12 of the spring can 9 and ends in a coupling element 15 which is visible in FIGS. 2 and 3 and is fastened above the bottom 12 or the spring can 9 on the body 11 of the motor vehicle. Another pipe 16 or pressure hose can be coupled to coupling element 15 radially from the outside, which in connected with a pressure source and is supported or fastened optionally at one or several points on the vehicle body 11. During compressing or rebounding movements and during steering movements of the vehicle wheel equipped with the gas spring 1, the pipe 16 carries out no movements and can therefore, for example, be connected over a short or favorable path with the pressure source.

As illustrated in FIG. 1, the shock absorber 5 axially penetrates the gas spring 1, a piston rod 17 projecting away from the shock absorber 5 upward. On the projecting end area 18, with the piston rod 17 penetrates a central opening 19 in the bottom 12 of the spring can 9 and is supported at this end area 18 on an elastic sealing body 20 which is engaged in the opening 19. On the bottom 12 of the spring can 9, a can-shaped bearing part 21 is fastened which has an upward-projecting cylinder wall 22, on which a part 23 of a roller bearing 24 is supported radially from the outside. This roller bearing 24 is supported by means of two exterior parts 25, 26 axially arranged behind one another on a cylinder wall 27 of a can-shaped supporting part 28 which is connected with the body 11 of the motor vehicle. As the result, the spring can 9 is directly or by way of an essentially fixed bearing part 21 supported on the part 23 of the roller bearing 24 which is also supported by way of an essentially fixed supporting part 28 on the vehicle body 11. The vehicle-fixed covering can be arranged axially in front of or behind the supporting part 28.

Figure 2:
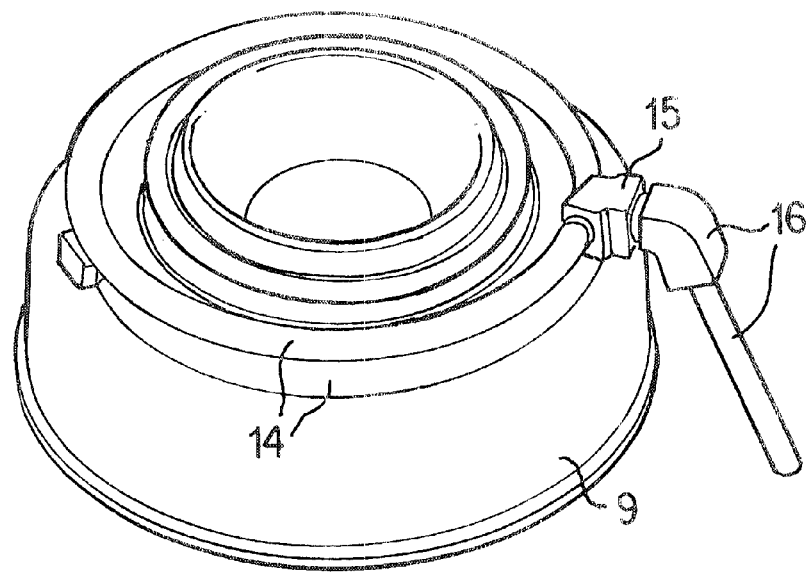
FIG. 2 is a perspective top view of the spring can and the pipe arranged above it.
Figure 3:
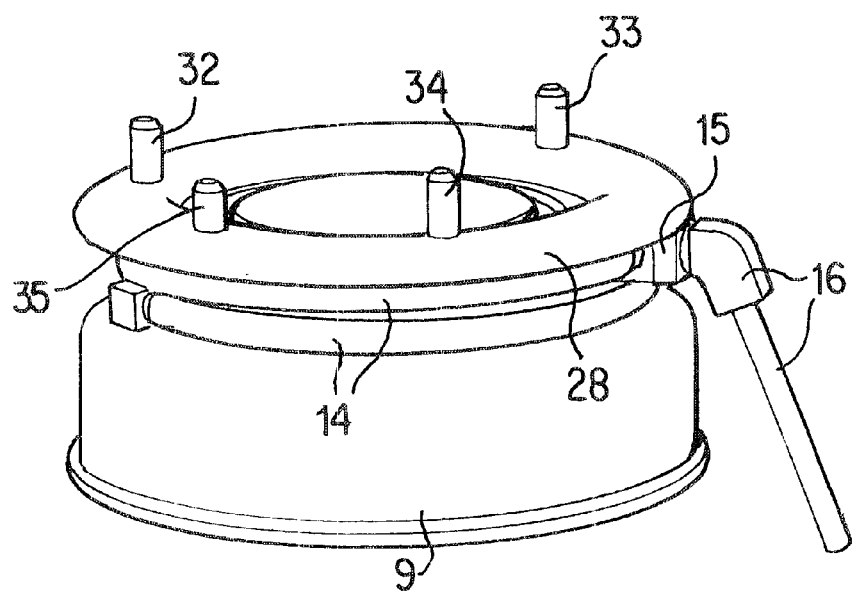
FIG. 3 is a view corresponding to FIG. 2 with the supporting part arranged above the spring can and the pipe.

FIG. 1 also shows that the can-shaped supporting part 28, in connection with the inserted vehicle-fixed covering can 29, forms a receiving space 30 which is open in the axially downward direction and in which the pipe 14 is accommodated which, in the receiving space 30, forms a loop closed along the circumference which extends approximately along an angle of 500 degrees at the circumference. Naturally, the loop can also extend along a larger or smaller angle at the circumference. The pipe 14 is made, for example, of the plastic polyamide (PA) material and, during steering movements of the vehicle wheel, can therefore elastically deform in one or the other direction, for example, in that the diameter of the loop is enlarged or reduced to an extent corresponding to the steering movement. In the covering can 29 and/or in the supporting part 28, a radial opening 31 is constructed through which another pipe 16 illustrated in FIGS. 2 and 3 is to be connected with the coupling element 15 in the receiving space 30, which coupling element 15 forms an end of the pipe 14 arranged above the spring can 9. The gas spring 1 and the shock absorber 5 are parts of a McPherson strut which is manufactured as a preassembled constructional unit and is to be connected by way of screws 32, 33, 34 with the bottom of a vehicle-body-fixed strut dome.

The perspective top view according to FIG. 2 illustrates that the pipe 14 extends at a radial distance to the axis of the gas spring approximately in a circular manner, the starting area and the end area of the pipe 14 being slightly axially offset with respect to one another.

FIG. 3 shows the supporting part 28 which is arranged above the spring can 9 and the pipe 14 and is to be connected by way of the three screws 32, 33, 34 with the vehicle body, and can be centered by way of a centering pin 35.

Instead of a pipe, a pressure hose or the like can also be used. The coupling point above the bottom of the spring can be eliminated if the pipe or the pressure hose is guided out of the receiving space above the spring can and is connected at another point with another pressure hose or another pipe or possibly directly with the pressure source. It is not necessary that the pressure hose or the pipe form at least one closed loop. The pressure hose or the pipe should only, at least in areas, be arranged such above the spring can that, corresponding to the steering movements of the vehicle wheel, the pressure hose or the pipe can elastically deform at least such only in areas that the steering movements are not hindered. The pressure hose or the pipe may be laid in such a manner that areas of the pressure hose or of the pipe come in contact with one another. However, preferably, the pressure hose or the pipe is constructed to be at least slightly stiff so that areas of the pressure hose or of the pipe do not touch one another and also do not come in contact with the walls of the receiving space.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A gas spring for a steerable vehicle wheel, comprising:
   U-shaped bellows;
   a suspension element having a roll-off surface on which a bottom end of said bellows is supported;
   a spring can on which an upper end of said U-shaped bellows is fastened,
   wherein said spring can is rotatable about an axis of the gas spring, is fastened to a vehicle body, and has an inlet opening to which a pressure hose or a pipe is connected;
   wherein said pressure hose or said pipe is arranged in a loop at least in an area above a bottom of the spring can and, during rotating movements of the spring can, is elastically deformable in said area.

2. A gas spring according to claim 1, wherein said U-shaped bellows are adapted to be loaded in an interior by pressure from a gaseous medium and are rolled in at the bottom end.

3. A gas spring according to claim 1, wherein the loop extends in an approximately circular manner at a radial distance from the axis of the gas spring.

4. A gas spring according to claim 1, wherein the inlet opening is in the bottom of the spring can.

5. A gas spring according to claim 1, wherein the pressure hose or the pipe is supported on a vehicle-fixed coupling element.

6. A gas spring according claim 5, wherein the pressure hose or the pipe ends on the vehicle-fixed coupling element and to which another pressure hose or another pipe is coupled.

7. A gas spring according to claim 1, further comprising a supporting part arranged above the spring can and connected with the vehicle body, wherein the supporting part supports the spring can approximately rotatably about the axis of the gas spring and forms a receiving space for the pressure hose or the pipe.

8. A gas spring according to claim 7, further comprising a vehicle-fixed covering can arranged axially behind the supporting part, wherein the pressure hose or the pipe is in the receiving space and below the supporting part and the vehicle-fixed covering can.

9. A gas spring according to claim 8, wherein at least one of the supporting part or the covering can covers the pressure hose or the pipe by an approximately cylindrical surface area and has a radial opening.

10. A gas spring according claim 1, wherein the suspension element is a shock absorber.

11. A gas spring according to claim 7, further comprising a roller bearing supported by exterior parts directly or by the supporting part on the vehicle body.

12. A gas spring according to claim 11, wherein the spring can is supported directly or by way of essentially fixed bearing part on a part of the roller bearing.

13. A gas spring according claim 11, further comprising an upward-projecting piston rod supported in an approximately central opening in a bottom of the spring can on an elastic sealing body, wherein the shock absorber axially penetrates the gas spring.

* * * * *